Patented Apr. 15, 1947

2,419,094

UNITED STATES PATENT OFFICE 2,419,094

CHROMITE ORE PIGMENT

Clifford Kanne Sloan, Thornton, Pa., assignor to E. I. du Pont de Nemours & Company, Wilmington, Del., a corporation of Delaware No Drawing. Application April 28, 1943, Serial No. 484,879

12 Claims. (Cl. 106—302)

This invention relates to new pigment compositions, and more particularly to novel, chromium-containing pigments exhibiting exceptionally high durability qualities.

More specifically, the invention pertains to improved chromium-containing pigments obtained directly from chromite ores and treated with a phosphate, the latter imparting improved cracking resistance characteristics to such pigments and enhancing their value and usefulness as rust-inhibitive pigments for metal protective coatings.

Metal protective pigments have long been used in the priming of organic film-forming compositions applied to the surfaces of metallic objects. Among useful pigments for the purpose are red lead and certain chromium-containing materials. Such products, however, have not met all requirements, judging from the wide use that is made of iron oxide, a relatively non-inhibitive but cheap type of pigment. Among existing deterrents to red lead use are its paint instability, chalking and high cost as used. Similarly, prior chromium-containing pigments are also characterized by high cost, due largely to the more expensive and time-consuming operations required in manufacturing the finished product.

In the co-pending U. S. application, Serial No. 484,878 filed April 28, 1943, wherein I appear as co-inventor with Gordon D. Patterson, highly useful, improved chromium-containing pigments, comprising a dry reaction product of chromite ore and an alkaline earth material are disclosed. Such products are obtained by roasting a finely-divided, intimate mixture of the components, followed by disintegration of the dry reaction mass to reduce it to a state of fine pigment subdivision. The resulting product is exceedingly useful as a pigmenting substance in organic film-forming compositions for the protection of metal surfaces against corrosion. In manufacturing said pigment, care must be exercised to obtain products of acceptable durability for general utility, e. g., care must be observed to obtain a pigment that does not have the property of imparting a shrinkage cracking tendency to the film during exposure, particularly to light and moisture, over surfaces having little adhesion for the film coating. This cracking usually results in premature breakdown of the film, with the consequence that the inherent inhibitive action of the pigment has less opportunity to continue.

I have discovered that if the chromium-containing pigments contemplated in said co-pending U. S. patent application Serial No. 484,878, filed April 28, 1943, are treated with an added phosphate modifying agent, quite unexpectedly the resulting product and coating compositions in which the treated pigment should be employed are effectively improved and production becomes assured of a novel non-cracking type of pigment exhibiting enhanced metal protective value.

It is among the objects of this invention, therefore, to overcome the disadvantages of prior chromium-containing pigments and to provide a novel, improved type of chromium-containing, metal protective pigment materials. It is among the particular objects of the invention to provide a chrome ore-alkaline earth material reaction product pigment which exhibits exceptionally high durability and other essential pigment qualities; to provide a novel method and means for decreasing or preventing altogether any shrinkage cracking tendency of films containing pigments obtained by roasting a finely-divided, intimate mixture of chromite ore and an alkaline earth material and then disintegrating the resulting product, and to increase the durability characteristics of such films in order that the inherent inhibitive action of the film can be exerted over a longer exposure period. Other objects and advantages of the invention will be evident from the ensuing description.

These and other objects are accomplished in this invention which comprises treating a chromium-containing pigment of the type contemplated in my said copending application Serial No. 484,878, filed April 28, 1943, with a phosphate of a metal from the group consisting of ammonium and an element of the "A" members of groups I and II of the periodic table.

In a more specific and preferred embodiment, the invention comprises enhancing the value and the durability characteristics of a pigment-useful roasted chromite ore-alkaline earth reaction product by intimately associating therewith a relatively minor quantity of a phosphate of a metal from the group consisting of ammonium and elements of the "A" members of groups I and II of the periodic table.

In practically adapting the invention, a relatively small amount, say, from about 5-20% (on the pigment basis) of the phosphate treating agent is intimately associated with the chromium-containing pigment, such admixture being preferably and conveniently effected during the manufacture or processing of the pigment. For instance, the association can be effected by wet or dry blending a mixture of the pigment and modifying agent, or by forming the phosphate, through reaction, in situ of the pigment. Preferably, the phosphate is incorporated in a chrome ore type of pigment disclosed in my said U. S. application Serial No. 484,878, filed April 28, 1943, by adding the phosphate directly to the pigment prior to the roasting operation; that is, during the latter stages of the grinding of the unroasted alkaline earth (preferably calcium oxide) chromite ore mixture (in the ratio between 40/60 and 50/50), since this advantageously insures that the phosphate particle size will be substantially commensurate with that of the other ingredients of the pigment.

The type of phosphate treating agent which I prefer to employ comprises pulverized calcium phosphate rock which, prior to the addition, has been suitably crushed to about 4-8 mesh, followed by attrition in a mill grinding to about 325 mesh.

After desired mixture of the pulverized chromite ore, alkaline earth material and calcium phosphate rock has been effected, the resulting material is subjected to roasting at a relatively high temperature, ranging, preferably, from about 1050° C. to about 1150° C., in the presence of an oxidizing agent. The extent of the roasting treatment is largely governed by the time required for supplying the oxygen component of the reaction, by the temperature used, the extent of hexavalent chromium conversion desired, and by the pH and other essential properties which it is desired the final pigment shall exhibit, as more particularly set forth in my said co-pending application. Usually, however, a roasting period of from about ½ to 1 hour suffices for the reaction, with periods ranging up to 2 to 6 hours being required in large scale operations. After the roasting and cooling, the phosphate-containing alkaline earth-chrome ore reaction product is converted directly to a pigment by subjection to disintegration in conventional grinding or pulverizing equipment, such as, for example, in a hammer mill of the "Mikropulverizer" type.

The resulting product, because of its low cost, satisfactory color, and hiding power characteristics, will be suitable for general use as a pigment, especially of the metal protective type, and as a sole pigmenting substance in a film-forming composition. Also, it will be useful as the primer pigment in films of organic coating compositions for the protection of metallic surfaces, and particularly materials subjected to corrosive or weathering influences. For example, it is highly useful in protecting iron and steel surfaces, non-ferrous metals, including aluminum, zinc, magnesium and the like, as well as alloys, particularly lightweight alloys, such as aluminum and magnesium, and types used in aircraft production. The addition of the phosphate serves to minimize or prevent entirely any tendency which the chrome ore pigments might have towards shrinkage or cracking and thereby greatly enhances its value as a metal protective pigment. Consequently, use can be made of the reaction product of this invention in any way in which a pigment, and more particularly an inhibiting pigment, can be used. It thus can be employed as a component of greases, non-drying oils, fatty acids and similar compositions for the protection of metallic surfaces against corrosion. Because of the low cost of the material, it can be used as a dry packing material for corrodible objects for transit, if desired.

To a more complete understanding of the invention, the following specific examples are given, these being illustrative of but not limiting the invention:

Example I

Twenty-eight hundred and eighty pounds of water are run into a wood vat equipped with a paddle agitator. Six hundred and forty-eight pounds of lump lime are slowly added with constant agitation so as to avoid overheating during the slaking process. The slaked lime is then fed as a water slurry by gravity to a 1200 gallon pebble mill, the charge being augmented by 216 pounds of pulverized calcium phosphate rock and 792 pounds of pulverized Transvaal chromite ore having a $Cr_2O_3$ content of 42%, the ore being previously pulverized to pass 100% through a 100 mesh sieve and 85% through a 325 mesh sieve. The charge in the ball mill is then subjected to a 3-hour grinding period at which time 97.2% of the suspended matter passes through a 325 mesh sieve. The ground slurry is then pumped to filter frames where the water content is reduced by half to give a press cake having 50% solids. The filter cake is approximately 1⅛ inch in thickness. The press cake is dried overnight in an oven heated by 20 pounds steam pressure. 1795 pounds of material is handled at this stage, the change in weight being largely due to the water taken up during slaking of the lime. The roughly broken-up press cake is then charged into a batch rotary furnace preheated by internal firing with fuel oil. The furnace is 10 ft. in length, 8 ft. in internal diameter, and rotates once each minute. The furnace is equipped with thermocouples at both ends, permitting control of temperature during the roast. After a 2-hour period required for bringing to temperature, the furnace is held at temperature for 3 hours, the temperature reading being 1150° C. at the front or combustion end of the furnace and 1100° C. at the exit end of the furnace. Fuel oil is supplied at 40 pounds pressure with a consumption of 17 gallons per hour. In addition to the primary air used in the combustion of the oil, an auxiliary air line is used to supply extra air at the rate of 140 cu. ft. per minute in order to promote oxidation. The roasted product is then discharged through a pair of manholes in the furnace into a "buggy" equipped with water-cooled coils. The product is in the form of small, friable, marble-like lumps at this stage averaging ½ inch in diameter. For use as a pigment, the dry reaction product is disintegrated to pigment form by passing through a "Mikropulverizer" equipped with a screen having openings of 0.020 inch. Linseed oil paint films pigmented therewith appear, after exposure, completely free of the cracking tendency exhibited by a system prepared in a similar manner except that the phosphate rock is omitted.

Thus, when the above phosphate-modified pigment is incorporated in linseed oil as a paint in which the pigment makes up 40% by volume of the film solids and exposed in the severe cracking test described below, the phosphate-modified pigment appears to be completely crack-resistant, whereas a control test with a corresponding but unmodified pigment shows moderately severe cracking. The following data is illustrative.

| Days of Exposure | Condition of Film in Test | |
|---|---|---|
| | Phosphate-Modified Pigment System, 45/55/15 Lime/Ore/Phosphate Rock | Unmodified Pigment System, 45/55 Lime/Ore |
| 5 days | No cracking | 1 medium long, narrow crack. |
| 13 days | do | 1 long med. wide crack, 3 short narrow cracks. |
| 17 days | do | 1 long med. wide crack, 3 med. long and wide cracks. |
| 21 days | do | 3 long wide cracks, 2 med. long and wide cracks. |
| 31 days | do | 3 long wide cracks, 3 med. long and wide cracks. |

The short-time cracking test is conducted by applying the pigmented linseed oil composition as a film 0.0015 inch thick to an amalgamated tin surface and exposing to a summer sun at an angle of 45° to the south using a sprinkling system to insure that the film is subjected at least once a day to a "rainfall" of at least 1 hour's duration. The severity of this cracking test is so great that it is unlikely that a pigment the cracking tendency of which requires 30 days to develop in this test would show any cracking at all on the surfaces of greater adhesiveness encountered in maintenance painting.

*Example II*

A dry reaction product pigment is prepared by wet grinding for 2 hours in a ball mill a 45/55/10 mixture of lime/chromite ore/calcium phosphate rock, filtering, drying, roasting 2 hours at 1100° C., cooling and disintegrating. The resultant pigment when incorporated in a linseed oil paint shows markedly improved resistance to cracking, comparison being made with a corresponding film made from a pigment identical with the above except that the calcium phosphate rock is omitted from the formula.

*Example III*

A metal protective pigment of improved resistance to cracking on exposure is obtained by grinding a water slurry of the following mixture 4 hours in a pebble mill, followed by drying, roasting 3 hours at 950° C. and disintegrating to pigment form:

|  | Parts by weight of ingredients |
|---|---|
| Lime | 1125 |
| Chromite ore | 1375 |
| Monosodium phosphate crystals | 500 |

The resistance to cracking of the modified pigment is shown by its behavior on outdoor exposure in a linseed oil system on three types of surfaces, namely, (1) on amalgamated tin, (2) on bright steel plate, and (3) on pre-rusted wire-brushed steel plate, comparison being made with a corresponding system prepared with a pigment identical with the above except that the monosodium phosphate ingredient is omitted.

These tests serve to show that the phosphate-modified pigment has improved durability characteristics as compared with the unmodified pigment both in the short term severe test on the low-adhesion amalgamated tin surface and also in the longer test on such practical surfaces as are encountered in maintenance painting.

*Example IV*

A series of chrome ore pigments is prepared by incorporating different phosphates of sodium and calcium in portions of a master mix of lime and chromite ore prior to roasting. The master mix for the series is prepared by dry ball mill grinding a 45/55 lime/chromite ore mixture overnight, slurrying with sufficient water to give a 25% suspension by weight. For a control pigment, a portion of this suspension is then dried down without filtration and the dry residue roasted 2½ hours at 1030° C. with ready access of air. The roasted material is then disintegrated to pigment form and incorporated in a linseed oil system for testing cracking resistance (as a film on amalgamated tin exposed as in the preceding examples).

Using both one coat and three coat systems in the test, all phosphate-treated systems are definitely more crack resistant than the unmodified control. The effectiveness in imparting crack resistance is in the following order, the amount of agent being expressed in terms of the sum of the lime and chromite ore ingredients:

| Agent | Amount Added |
|---|---|
|  | *Per cent* |
| Tricalcium phosphate | 20 |
| Dicalcium phosphate | 20 |
| Disodium phosphate | 20 |
| Trisodium phosphate | 20 |
| Monosodium phosphate | 12 |
| Do | 20 |
| Do | 4 |

*Example V*

Several phosphate-modified pigments are prepared by adding the modifier to portions of a master batch of roasted finished pigment prepared from lime and chromite ore, for direct comparison with the treatments of Example IV. The phosphates are first separately roasted 15 minutes at 1030° C. prior to dry-mixing with the roasted pigment. In each case, 20% of unroasted phosphate (on a roasted pigment basis) is selected for treatment. The actual amount of roasted phosphate added is less than this 20% figure due to decomposition (loss of water of hydration and composition) occurring during the separate roasting operation of some of the added phosphates.

The following table shows the effect of this phosphate after treatment on the cracking resistance of the pigment:

| Phosphate Separately Roasted and Added to Finished Pigment | Probable Form as Added | Extent of Cracking of One Coat on Amalgamated Tin | | |
|---|---|---|---|---|
| | | 8 days | 12 days | 26 days |
| None (Control) | | 1 crack | 5 cracks | 6 cracks. |
| Monosodium phosphate crystals | $NaPO_3$ | No cracking | No cracking | No cracking. |
| Disodium phosphate crystals | $Na_4P_2O_7$ | do | do | 1 slight crack. |
| Dicalcium phosphate | $Ca_2P_2O_7$ | do | do | 2 slight cracks. |
| Tricalcium phosphate (CP grade) | $Ca_3(PO_4)_2$ | do | do | 3 slight cracks. |

A definite improvement in cracking resistance is evident in each of these cases. However, the addition of phosphates before roasting is preferred in view of the more beneficial effects which modification at this stage imparts. Particularly when using trisodium phosphate, it is very desirable that addition be made before roasting. Beneficial results also accrue from the separate addition of the heat decomposition products of the phosphates, including sodium metaphosphate, sodium pyrophosphate, calcium pyrophosphate, and the like.

*Example VI*

A calcium phosphate is incorporated in a lime/chromite reaction product pigment by addition of phosphoric acid to a wet ground paste of a 50/50 mixture of lime and chromite ore. The treated mixture is then dried and roasted 1 hour at 950° C. When disintegrated to pigment form and incorporated in a linseed oil paint, the resulting film is found to be more resistant to cracking than is a film of a system prepared identically except that the phosphate is omitted. The resistance to cracking is improved as the amount of phosphoric acid is increased successively, equivalent to 1/10, 1/5 and 2/5 of the lime in the raw pigment ingredient.

While I have described my invention in its application to certain specific and preferred embodiments, it is not to be construed as limited thereto. Hence, suitable variations may be had without departing from its underlying spirit and scope. For example, while the preferred modifying agent, in amounts ranging from about 5-20%, on the pigment basis, comprises pulverized calcium phosphate rock, the use of other phosphates, amounts or mixtures is contemplated.

Calcium phosphate use is indicated as most practical and preferred merely because of its ready availability, effectiveness and cheapness. Generally, however, use is contemplated of any alkali or alkaline earth phosphate, the term "phosphate" embracing salts of phosphoric acid containing the trivalent $PO_4^{---}$ radical, the tetravalent $P_2O_7$ radical and the monovalent $PO_3$ radical, such as normal or tertiary phosphates, dibasic or secondary phosphates, monobasic or primary phosphates, or double or triple phosphates, as well as the various alkali and alkaline earth hypo, ortho, meta or pyrophosphates. Elements of the "A" members of groups I and II of the periodic table are especially contemplated as usefully employable alkali and alkaline earth phosphates, specific examples thereof including the phosphates of ammonium, lithium, sodium, potassium, rubidium, cesium, calcium, strontium and barium, etc. Among alkaline earth phosphates, calcium compounds are preferred for use, not only because of their relatively low cost, but because calcium compound treated systems provide complete freedom from any mild film blistering on early exposure to moisture over metal surfaces of low adhesion which the more active alkali compounds, such as sodium and potassium, particularly when present in relatively large concentration, might induce.

The preferred calcium phosphate compound, i. e., calcium phosphate rock, consists largely of tertiary calcium phosphate ($Ca_3(PO_4)_2$). Examples of other calcium phosphates include secondary calcium phosphate (including "precipitated bone" or $CaHPO_4$), the primary calcium phosphate, $CaH_4(PO_4)_2$ and the commercial acid phosphate, "super-phosphate" of fertilizing grade which contains the latter. Likewise, the related calcium metaphosphate and calcium pyrophosphate compounds as well as other meta or pyrophosphates of the contemplated metals, or of ammonia, are also useful.

Selection of the amount of phosphate to be added is not highly critical. The choice depends on a number of factors including degree of cracking improvement required and material cost. As already noted, 20% of the agent based on the weight of other pigment ingredients usually is sufficient to give the desired effect. In some cases, as low as 5% of phosphate, or even lower amounts, can be used, although generally it is necessary that at least this amount be used, with amounts of about 10% or 15% being found to be sometimes necessary. Accordingly, use is contemplated herein of amounts of phosphate ranging from 5-20% and from 10-20% (on the pigment basis). Larger quantities than 20% and up to, say, about 50% (on the pigment basis) also may be used, if desired. Normally, however, this is unnecessary since desired improvement in cracking resistance and film durability results when a 20% concentration of agent is resorted to. The use of quantities in excess of the amounts indicated is not recommended, since such excess quantities may act as a diluent as far as specific rusting and corrosion inhibition is concerned.

As stated, a preferred mode of proceeding in the operation of the invention is to add the pulverized calcium phosphate rock, or mixture, during the latter stages of the grinding of the unroasted alkaline earth chromite ore mixture so that the phosphate particle size will be commensurate with that of the other ingredients. Usually, it suffices to crush the rock to about 4-8 mesh, followed by attrition mill grinding to about 4-100 mesh prior to addition to the final grind of the other components. If desired, the complete grinding of the calcium phosphate rock can be carried out separately (so that substantially all of the material passes a 325 mesh screen) and then simply blend with the other ingredients. When it is necessary to grind the other ingredients to obtain suitable pigment particle size by wet pebble mill grinding, it is preferred to add the phosphate rock in the 40-100 mesh form at the start of the wet grind, thus combining the operations of final grinding and blending. It is also more advantageous, from the standpoint of maximum effectiveness in cracking resistance, that the modifying phosphate be intimately mixed with the alkaline earth/chromite ore material prior to roasting of the mixture. In this manner a more homogeneous and intimate association of phosphate modifying agent and pigment is assured. Though less advantageous results accrue when the phosphate is incorporated in the pigment after the roasting operation, and a still lesser degree of improvement is obtained by addition of the agent to the final coating composition vehicle, these latter methods of intimately associating the phosphate with the pigment are also contemplated as useful in adapting the invention to practice.

If desired, intimate association of the phosphate with the other components may be effected by mixing all components in the dry state and then pulverizing and mixing the resulting mass. In certain instances, such as when adding a very basic material such as trisodium phosphate, it is obligatory that the agent be added prior to roasting. If desired also, the phosphate modifying agent may be generated in situ of the chromium-containing pigment or unroasted chrome ore-alkaline earth material reaction mass. This can be conveniently effected, for instance, by treating the pigment or mass with phosphoric acid, ammonium phosphates, such as diammonium phosphate or any other phosphates which, on contact with the pigment, become converted, through reaction, to produce the desired phosphate.

Although illustrated as applied to a pigment prepared from a chromite ore and an alkaline earth material comprising calcium compounds, such as lime and limestone, the invention is obviously generally applicable to pigments prepared with other types of alkaline earth materials, and those prepared in accordance with the disclosure of said co-pending application Serial No. 484,878, filed April 28, 1943. Thus, as the alkaline earth component for reaction with the chromite ore may be used any compound or mixture thereof which either is in the oxide form or is thermally decomposable to the alkaline earth oxide at or below the temperature used in the roasting operation. Specifically useful oxides include those of calcium, strontium or barium. Examples of other useful compounds include the various alkaline earth hydroxides and salts, such as the carbonates, acetates, etc., which decompose in the presence of the chromite ore during the roasting operation. Calcium oxide, calcium hydroxide and calcium carbonate are especially preferred for use because of their ready availability and adaptability.

No essential modification in the ordinary processing conditions of the pigment which are disclosed in said co-pending application will be found necessary beyond that of adding the phosphate treating agent. However, the improvement in cracking resistance resulting from this treatment will be found to afford greater freedom or latitude in the operation of the processes therein contemplated. For example, with a phosphate present, choices as to raw material compositions, length of grinding, roasting temperature and duration of roasting are not as critical. As compared with the unmodified pigment, it is often possible to obtain a more durable product by use of (1) a higher ratio of alkaline earth material to ore, (2) a shorter grind of the ingredients, (3) a lower roasting temperature, and (4) a shorter period of roast.

In the preferred adaptation of the invention, it will be found desirable to observe the precautions set forth in said co-pending application to make sure that the final pigment product has a certain range and combination of properties, including hexavalent chromium content, pH and acid-insoluble residue. The alkaline earth-chromite ore dry reaction pigment should contain at least 1.5% and up to, say, 30% of hexavalent chromium, calculated as $CrO_3$, and as determined by solution of the pigment in nitric acid and titration with a standard ferrous ammonium sulfate solution. For marked effectiveness, it is desirable that the hexavalent chromium content, calculated as $CrO_3$, be 8% to about 21%, and that to insure optimum results, such hexavalent chromium content be between 10% and 18%, these factors being readily controllable, as more particularly set forth in said co-pending application. The pH value of the pigment (for the calcium product) should not be in excess of about 11.80, and not below about 8.9. To insure film durability, it is preferred that the product have a definitely low pH, e. g., from 0.3 to 0.5 pH units below the values set forth in said co-pending application or at or below the preferred range of between 10.5 and 11.2.

The acid solubility of the final product (expressed in terms of the percentage of the pigment remaining insoluble after digesting in warm 1:1 nitric acid) should range from about 0% to 90%, a particularly useful range being from 1% to 15%, with a most preferred range being from about 5-10%. The water-solubility of the products of this invention and the amount of hexavalent chromium leached out of coating compositions pigmented therewith are definitely less than for the unmodified products described and claimed in said co-pending application.

As set forth in said co-pending application, most commercial grades of foreign or domestic chromite ($Cr_2O_3.FeO$) ore are suitable for use herein to react with the calcium oxide or lime. Transvaal chromite ores having an iron oxide content as high as 24% and a $Cr_2O_3$ content in the range of 40-50% are particularly suited for use, although higher or lower grade ores can also be used. Similarly, as the alkaline earth component of the reaction, any material or mixture may be employed that is thermally decomposable to the alkaline earth oxide at or below the temperature used in the chromite roast. The oxides of calcium, strontium and barium are especially suitable as such, as are the alkaline earth hydroxides and salts, including carbonates and acetates and the like that decompose in the presence of chromite ore at or below the roasting reaction temperature.

Comminution of the ore necessary for obtaining both reaction during roasting and the required fine pigment particle size can be conveniently carried out prior to mixing with the alkaline earth material and/or phosphate. The chromite ore is most economically separately processed from the lump form to a finely-divided powder, most of which passes through a 325-mesh screen. For this purpose, a series of dry grinds through jaw crusher, disc attrition and steel ball mills, usually suffices to reduce the ore to a stage where all of the material passes through a 100-mesh screen, and about 85% passes through a 325-mesh screen. The final comminuation is preferably done in the mix with the alkaline earth material and phosphate. Such final comminution is preferably continued until at least 95% and preferably at least 99% of the material passes a 325-mesh screen.

While roasting or calcination temperatures ranging from about 1050° C. to about 1150° C. are preferred for use, lower temperatures to, say, 900° C.–950° C. or even down to as low as 700° C., may be used. Higher temperatures, up to, say, 1200° C., may also be used, if desired. Roasting of the reaction mass is effected, as already stated, in the presence of an oxidizing medium, preferably oxygen or other gaseous type of agent, such as air, etc. The time of the roast is largely governed by that required for supplying the oxygen component of the reaction. Thus, from ½ to 1 hour usually suffices for the reaction in small scale operations in an electrically-heated furnace, whereas as much as 2–6 hours at the indicated preferred temperature is often required when operating the process in an internally-fired furnace on a relatively large commercial scale.

The calcined alkaline earth/chrome ore/phosphate reaction product, after cooling, is directly converted into pigment form by disintegration treatment. This can be conveniently effected by reducing the particle size thereof in conventional disintegration or grinding equipment, such as in a hammer mill of the "Mikropulverizer" type, or in accordance with the other methods referred to in said co-pending application, Serial No. 484,878. Particle size of the final product is also of considerable importance in determining its usefulness for general pigment purposes and especially as a pigmenting ingredient in metal protective paints. In general, the final product should be substantially free of particles larger than 20 microns, at least 90% of its particles should pass 325 mesh, and the grit value of the raw pigment (% retained by 325 mesh screen) should be less than 15%. Preferably, the major portion of the pigment is below 5 microns, with a substantial fraction thereof being as low as 0.5 to 2 microns, e. g., at least 95% of the particles should pass 325 mesh, and its grit value should be less than 5%. An optimum type of pigment affords a 99% passage through 325 mesh and has a grit value of less than 2%. By resort to the grinding steps before and after roasting, a pigment having these satisfactory particle size and other values will be obtained. As already stated, one pass of the roasted material through a "Mikropulverizer" is usually sufficient to reduce the material to a state of subdivision suitable for pigment use. The residue retained in the 325-mesh screen test is somewhat governed by the screen used in the "Mikropulverizer" disintegration. With a 0.020 inch screen, the 325-mesh residue may be of the order of 1 to 5%, whereas with a 0.029 inch screen it is about 2 to 10%. With an air classification unit in series with the grinding unit, even greater diminution of particle size can be obtained, e. g., less than ½% of the product being retained by a 325-mesh screen. These figures are somewhat dependent on the many factors of processing.

Due to its finely-divided condition, relatively low cost, improved color, hiding power, durability, cracking resistance and corrosion inhibiting power, my preferred chrome reaction product pigment will be found to be suitable for direct use as the sole pigmenting substance of film-forming compositions. While I have already alluded to a few of the coating compositions in which my phosphate-containing pigment is useful, generally it is employable in organic film-forming vehicles, such as paints, enamels, lacquers, finishes, etc., and has particular utility when such systems are used in the protection of metal surfaces. Thus, it is useful in various oleoresinous vehicles, including linseed oil, China-wood oil, oiticica oil, and the like, nitrocellulose and other cellulose derivatives used in coating compositions, chlorinated rubber, alkyd and alkyd-fortified oleoresinous systems, phenol-formaldehyde resins such as Bakelite and the like, Vinylite, vinyl acetate and polyhydric alcohol-mixed esters of drying oil acids and other monofunctional monocarboxylic acids such as beta-furyl-acrylic acid, delta-2,4-hexadienoic acid, methacrylic acid, alpha-vinylcinnamic acid and the like, and synthetic resin vehicles generally. When so employed, a sufficient quantity of the pigmenting material is used as will provide a final film containing about 30%–40% by volume of the pigment. If desired, the pigment may be suitably extended, with other materials, such as are customarily employed with prior art primer pigments. Well-known extenders include iron oxide, ferrite yellow, talc, asbestine, various types of silicates, calcium sulfate, barium sulfate, and the like. If desired, also, the pigment can be augmented by adding thereto other prior art colored or white prime pigments, such as red lead, zinc yellow, titanium oxide, zinc sulfide. lithopone, or various organic dyestuffs, etc.

As is the case in the use of other primer pigments, top-coats can be applied over the primer film to increase durability of the system containing the chromite ore reaction product pigment. Conventional black and aluminum topcoats are among the systems which are satisfactory for application over a film pigmented with my phosphate-treated reaction product. An uncoated primer film containing my pigment, however, will prove to be relatively durable. Thus, a primer film containing my pigment is usually intact and serviceable at a period in exposure when a red lead film is badly chalked and failing by erosion.

If desired, dispersion-control agents of the polar type, including materials of anionic and cationic characteristics, such as disclosed in our co-pending application Ser. No. 484,883, filed April 28, 1943, may be added to the pigment to modify its dispersion and water-sensitivity characteristics, such as can stability, degree of hard caking, application, and the like.

I claim as my invention:

1. As a new pigment composition, the disintegrated reaction product from a calcined mixture consisting of a chromite ore, an alkaline earth metal compound, and from 5–50%, on the pigment basis, of an added phosphate from the group consisting of ammonium and elements of the "A" members of groups I and II of the periodic table, said chromite ore and alkaline earth metal compound being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision with at least 90% of its particles being capable of passing a 325 mesh screen.

2. As a new pigment composition, the disintegrated reaction product from a calcined mixture consisting of a chromite ore, an alkaline earth metal compound, and from 5–50%, on the pigment basis, of an added alkaline earth metal phosphate, said chromite ore and alkaline earth metal compound being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision with at least 90% of its particles being capable of passing a 325 mesh screen.

3. As a new metal protective pigment composition, the disintegrated reaction product from a calcined mixture consisting of chromite ore, calcium oxide, and from 5–50%, on the pigment basis, of added calcium phosphate, said chromite ore and calcium oxide being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision with at least 90% of its particles being capable of passing a 325 mesh screen.

4. As a new metal protective pigment composition, the disintegrated reaction product from a calcined mixture consisting of a chromite ore, calcium oxide, and from 10–20%, on the pigment basis, of added calcium phosphate rock, said chromite ore and calcium oxide being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision, the major portion of its particles being below 5 microns and at least 95% of said particles being capable of passing a 325 mesh screen.

5. As a new pigment composition, the disintegrated reaction product of a calcined mixture consisting of a chromite ore, an alkaline earth compound heat-decomposable to the oxide, and from 10–20%, on the pigment basis, of an added phosphate from the group consisting of ammonium and an element of the "A" members of groups I and II of the periodic table, said chromite ore and alkaline earth compound being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision with at least 90% of its particles being capable of passing a 325 mesh screen.

6. As a new pigment composition, the disintegrated reaction product of a calcined mixture consisting of a chromite ore, an alkaline earth compound heat-decomposable to the oxide, and from about 10–20%, on the pigment basis, of added calcium phosphate, said chromite ore and alkaline earth compound being in the ratio between 50/50 and 60/40, said product containing from 1.5% to 30% of hexavalent chromium, calculated as $CrO_3$, and having a pH of from 8.9 to 11.8, an acid-insoluble residue ranging from 1–15%, and being in a pigment particle size state of subdivision with at least 90% of its particles being capable of passing a 325 mesh screen.

7. A method for producing a cracking-resistant pigment composition which comprises calcining in the presence of an oxidizing agent and at a temperature ranging from 1050° C. to 1150° C. a mixture consisting of chromite ore; an alkaline earth compound, said chromite ore and alkaline earth compound being in the ratio between 50/50 and 60/40, and from 5–20%, on the pigment basis, of a phosphate from the group consisting of ammonium and elements of the "A" members of groups I and II of the periodic table, until a product containing from 1.5% to 30% of hexavalent chromium, calculated as $CrO_3$, having a pH value ranging from 8.9 to 11.8 and an acid-insoluble residue ranging from 1–15%, is obtained, and then disintegrating the resulting dry reaction product to a state of pigment fineness whereby the major portion of its particles are below 5 microns in size, with at least 95% of its particles being capable of passing a 325 mesh screen.

8. A process for producing an improved, non-cracking pigment composition which comprises calcining, at a temperature ranging from 1050° C. to about 1150° C., in the presence of a gaseous oxidizing agent, a finely-divided, intimate mixture consisting of chromite ore, an alkaline earth metal compound heat-decomposable to the oxide, said chromite ore and alkaline earth compound being in the ratio between 50/50 and 60/40, and from about 5–20%, on the pigment basis, of calcium phosphate, continuing said calcination until the reaction product contains from 8–21% of hexavalent chromium, calculated as $CrO_3$, has a pH value ranging from 8.9 to 11.8 and an acid-insoluble residue of from 5–10%, and then disintegrating the resulting dry recation product to the point where the pigment fineness and to the point where the major portion of its particles are below 5 microns in size and at least 95% of said particles are capable of passing a 325 mesh screen.

9. A process for producing an improved, non-cracking pigment composition which comprises calcining, at a temperature ranging from 1050° C. to about 1150° C., in the presence of a gaseous oxidizing agent, a finely-divided, intimate mixture consisting of chromite ore, calcium oxide, said ore and said oxide being in the ratio between 50/50 and 60/40, and from about 5–20%, on the pigment basis, of calcium phosphate, continuing said calcination until the reaction product contains from 8–21% of hexavalent chromium, calculated as $CrO_3$, has a pH value ranging from 8.9 to 11.8 and an acid-insoluble residue of from 5–10%, and then disintegrating the resulting dry reaction product to pigment fineness and to the point where the major portion of its particles are below 5 microns in size and at least 95% of said particles are capable of passing a 325 mesh screen.

10. As a new pigment composition, the disintegrated reaction product from a calcined mixture consisting of a chromite ore, an alkaline earth metal compound, and from 5–50%, on the pigment basis, of an alkali phosphate, said chromite ore and alkaline earth metal compound being in the ratio between 50/50 and 60/40, said product containing from 1.5% to 30% of hexavalent chromium, calculated as $CrO_3$, having a pH of from 8.9 to 11.8, an acid-insoluble residue ranging from 1–15%, and being in a pigment particle size state of subdivision with at least 90% of its particles being capable of passing a 325 mesh screen.

11. As a new pigment composition, the disintegrated reaction product from a calcined mixture consisting of a chromite ore, calcium oxide, and from 10–20%, on the pigment basis, of sodium phosphate, said chromite ore and calcium oxide being in the ratio between 50/50 and 60/40, and said product containing from 1.5% to 30% of hexavalent chromium, calculated as $CrO_3$, having a pH of from 8.9 to 11.8, an acid-insoluble residue ranging from 1–15%, and being in a pigment particle size state of subdivision with at least 90% of its particles being capable of passing a 325 mesh screen.

12. As a new pigment composition, the disintegrated reaction product from a calcined mixture consisting of a chromite ore, calcium oxide, and from 10–20%, on the pigment basis, of barium phosphate, said chromite ore and calcium oxide being in the ratio between 50/50 and 60/40, and said product containing from 1.5% to 30% of hexavalent chromium, calculated as $CrO_3$, having a pH of from 8.9 to 11.8, an acid-insoluble residue ranging from 1–15%, and being in a pigment particle size state of subdivision with at least 90% of its particles being capable of passing a 325 mesh screen.

CLIFFORD KANNE SLOAN.

REFERENCES CITED

The following references are of record in the file of this patent:

UNITED STATES PATENTS

| Number | Name | Date |
| --- | --- | --- |
| 2,133,728 | Teetor | Oct. 18, 1938 |
| 2,359,697 | Udy | Oct. 3, 1944 |

FOREIGN PATENTS

| Number | Country | Date |
| --- | --- | --- |
| 397,434 | British | Aug. 24, 1933 |

OTHER REFERENCES

Doerner, State College of Washington, Mining Experiment Station, Bulletin V, Sept. 1939, page 6, 23–56.